Patented June 29, 1943

2,322,907

UNITED STATES PATENT OFFICE 2,322,907

1-ACYLAMINOARYL-5-PYRAZOLONES

Paul Zervas, Cologne Mulheim, Germany, assignor to General Aniline & Film Corporation, New York, N. Y., a corporation of Delaware No Drawing. Application August 9, 1941, Serial No. 406,242. In Germany January 29, 1940

8 Claims. (Cl. 260—310)

The present invention relates to 1-acylaminoaryl-5-pyrazolones and to a method of preparing the same.

It is known that 1-(4'-acetylaminophenyl)-3-methyl-5-pyrazolone can be prepared by reacting 4-acetylaminophenylhydrazine with excess acetoacetic ester at about 150° C. It is further known that 1-(4'-benzoylaminophenyl)-3-methyl-5-pyrazolone can be prepared by the interaction of the hydrazine of p-benzoylphenylenediamine with excess (about 50 per cent) acetoacetic ester in glacial acetic acid and in the presence of sodium acetate. Also the preparation of the urea of the 1-(3'-aminophenyl)-3-methyl-5-pyrazolone is known; this urea is obtained by passing phosgene into the solution of the pyrazolone in toluene in the presence of dimethylaniline.

I have now found that acylaminoaryl-5-pyrazolones hitherto unknown or obtainable only very difficultly can be prepared in a very simple manner and in very good yields, if 1-acylaminoaryl-5-pyrazolone-4-sulfonic acids obtainable according to my copending application Ser. No. 406,240, filed August 9, 1941 (entitled "Condensation products of 1-aminoaryl-5-pyrazolone-4-sulfonic acids") Patent 2,315,835 are treated with strong sulfuric acid at increased temperatures; with this treatment the sulfonic acid group in the 4-position is split off, whereas the acylamino groups are not saponified.

The acylaminoaryl-5-pyrazolones thus obtained which are new apart from the few exceptions mentioned above are valuable intermediates for the production of dyestuffs.

The 1-acylaminoaryl-5-pyrazolone-4-sulfonic acids used as starting materials are, in general, obtainable according to the above mentioned copending application by reacting the amino group of 1-aminoaryl-5-pyrazolone-4-sulfonic acids with organic compounds containing one or more replaceable halogen groups. As suitable compounds containing one or more replaceable halogen groups may be used, e. g., phosgene, mono- and dicarboxylic acid chlorides. The condensation is effected in aqueous medium at an alkaline to weakly acid reaction. The method of producing the starting materials is only given as illustrative, and applicant's process is not intended to be limited to the treatment of 1-acylaminoaryl-5-pyrazolone-4-sulfonic acids obtained only by the method described in the aforementioned co-pending application.

The following examples illustrate the invention without, however, limiting it thereto, the parts being by weight.

Example 1

100 parts of 1-(3'-benzoylaminophenyl)-3-methyl-5-pyrazolone-4-sulfonic acid are added to 850 parts of sulfuric acid of 60° Bé. in such manner that the temperature does not rise above 50° C. The mixture is now heated for one hour to 55–57° C. whereby a clear solution is formed. In order to isolate the reaction product the acid solution is poured on ice and the separated 1-(3'-benzoylaminophenyl)-3-methyl-5-pyrazolone is filtered with suction. Yield about 75 per cent.

If the 1-(4'-benzoylaminophenyl)-3-methyl-5-pyrazolone-4-sulfonic acid or the 1-(3'-benzoylaminophenyl)-5-pyrazolone-3-carboxylic acid-4-sulfonic acid is used instead of the 1-(3'-benzoylaminophenyl)-3-methyl-5-pyrazolone-4-sulfonic acid the corresponding pyrazolone derivatives are obtained with the same good yield.

Example 2

500 parts of an about 43 per cent paste of 1-[3'-(3''-nitrobenzoylamino)-phenyl]-5-pyrazolone-3-carboxylic acid 4-sulfonic acid are gradually added to 2000 parts of sulfuric acid of 60° Bé. in such manner that the temperature does not rise above 50° C. The paste dissolves after being stirred for some time. In order to completely split off the sulfonic acid group the mixture is heated for one hour to 55° C. After cooling the acid solution is poured on 1700 parts of ice and the separated 1-[3'-(3''-nitrobenzoylamino)-phenyl]-5-pyrazolone-3-carboxylic acid is filtered with suction. Yield about 90 per cent.

If the 1-[3'-(4''-nitrobenzoylamino)-phenyl]-5-pyrazolone-3-carboxylic acid-4-sulfonic acid or the 1-[4'-(4''-nitrobenzoylamino)-phenyl]-3-methyl-5-pyrazolone-4-sulfonic acid is used instead of the 1-[3'-(3''-nitrobenzoylamino)-phenyl]-5-pyrazolone-3-carboxylic acid-4-sulfonic acid the corresponding pyrazolone derivatives are obtained with the same good yield.

Example 3

500 parts of an about 40 per cent paste of 1-[4'-(4''-aminobenzoylamino)-phenyl]-3-methyl-5-pyrazolone-4-sulfonic acid are added to 3000 parts of sulfuric acid of 60° Bé. in the manner described in Example 2. The mixture is stirred for 2 hours until it dissolves at 50–52° C. and poured on ice whereby the 1-[4'-(4''-aminobenzoylamino)-phenyl]-3-methyl-5-pyrazolone separates with a yield of 85 to 90 per cent.

In the same manner the 1-[4'-(3''-aminobenzoylamino)-phenyl]-3-methyl-5-pyrazolone is obtained from the 1-[4'-(3''-aminobenzoylamino)-phenyl]-3-methyl-5-pyrazolone-4-sulfonic acid and the 1-[3'-(4''-aminobenzoylamino)-phenyl]-5-pyrazolone-3-carboxylic acid from the 1-[3'-(4''-aminobenzoylamino)-phenyl]-5-pyrazolone-3-carboxylic acid-4-sulfonic acid.

*Example 4*

300 parts of an about 35 per cent paste of the condensation product obtained from 1-(4'-aminophenyl)-3-methyl-5-pyrazolone - 4 - sulfonic acid and phosgene are added to 1600 parts of sulfuric acid of 60° Bé. and heated to 55-57° C. for one hour. The acid solution is worked up in the manner stated in Example 1 whereby the pyrazolone derivative of the following constitution

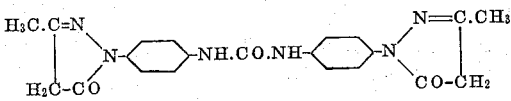

is formed with a yield of about 80 per cent.

*Example 5*

100 parts of the condensation product obtained from 1-(4'-aminophenyl) - 3 - methyl-5-pyrazolone-4-sulfonic acid and benzene-1.4-dicarboxylic acid chloride are added to 680 parts of sulfuric acid of 60° Bé., heated according to Example 1 and the reaction product is isolated with a yield of about 70-75 per cent by pouring the mixture on ice. The pyrazolone derivative thus obtained possesses the following constitution:

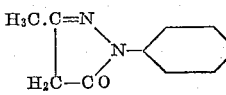

*Example 6*

100 parts of 1-(4'-acetylaminophenyl) - 3 - methyl-5-pyrazolone-4-sulfonic acid are added to 500 parts of sulfuric acid of 60° Bé. in such a manner that the temperature does not rise above 40° C. The mixture is then heated for one hour to 45-50° C. The acid solution is poured on ice and the 1-(4'-acetylaminophenyl)-3-methyl-5-pyrazolone separated in a yield of about 60-65 per cent is filtered with suction.

I claim:

1. Process of preparing 1-acylamino-phenyl-5-pyrazolones which comprises splitting off the 4-sulfonic acid group of 1-acylamino-phenyl-5-pyrazolone-4-sulfonic acids by treating these acids with strong sulfuric acid at a sufficiently elevated temperature at which the 4-sulfonic acid group splits off.

2. Process of preparing 1-acylamino-phenyl-5-pyrazolones which comprises splitting off the 4-sulfonic acid group of 1-acylamino-phenyl-5-pyrazolone-4-sulfonic acids by treating these acids with strong sulfuric acid at temperatures of about 40° C. to about 60° C.

3. Process of preparing 1-aroylamino-phenyl-5-pyrazolones which comprises splitting off the 4-sulfonic acid group of 1-aroylamino-phenyl-5-pyrazolone-4-sulfonic acids by treating these acids with strong sulfuric acid at temperatures of about 40° C. to about 60° C.

4. Process of preparing 1-nitrobenzoylaminophenyl-5-pyrazolones which comprises splitting off the 4-sulfonic acid group of 1-nitrobenzoylaminophenyl-5-pyrazolone-4-sulfonic acids by treating these acids with strong sulfonic acid at temperatures of about 40° C. to about 60° C.

5. Process of preparing 1-[3'-(3''-nitrobenzoylamino)-phenyl]-5-pyrazolone-3 - carboxylic acid which comprises splitting off the 4-sulfonic acid of 1-[3'-(3''-nitrobenzoylamino)-phenyl]-5-pyrazolone-3-carboxylic acid-4-sulfonic acid group by treating this acid with strong sulfuric acid at about 50° C. to about 55° C.

6. Process of preparing 1-aminobenzoylaminophenyl-5-pyrazolones which comprises splitting off the 4-sulfonic acid group of 1-aminobenzoylaminophenyl-5-pyrazolone-4-sulfonic acids by treating these acids with strong sulfuric acid at temperatures of about 40° C. to about 60° C.

7. Process of preparing 1-[4'-(4''-aminobenzoylamino)-phenyl] - 3 - methyl - 5 - pyrazolone which comprises splitting off the 4-sulfonic acid group of 1-[4'-(4''-aminobenzoylamino)-phenyl]-3-methyl-5-pyrazolone-4-sulfonic acid by treating this acid with strong sulfuric acid at about 50° C.

8. Process of preparing the symmetric urea of 1-(4'-aminophenyl)-3-methyl - 5 - pyrazolone which comprises splitting off the 4-sulfonic acid groups of the symmetric urea of 1-(4'-aminophenyl) - 3 - methyl-5-pyrazolone-4-sulfonic acid by treating this urea with strong sulfuric acid at about 55° C.

PAUL ZERVAS.

Certificate of Correction

Patent No. 2,322,907.

June 29, 1943.

PAUL ZERVAS

It is hereby certified that error appears in the printed specification of the above numbered patent requiring correction as follows: Page 2, second column, line 20, claim 4, for the word "sulfonic" read *sulfuric*; and that the said Letters Patent should be read with this correction therein that the same may conform to the record of the case in the Patent Office.

Signed and sealed this 22nd day of April, A. D. 1947.

[SEAL]

LESLIE FRAZER,
*First Assistant Commissioner of Patents.*